US010962658B2

(12) United States Patent
Mellor et al.

(10) Patent No.: US 10,962,658 B2
(45) Date of Patent: Mar. 30, 2021

(54) PORTABLE SURVEY METER AND METHOD

(71) Applicant: Create Technologies Limited, Cockermouth (GB)

(72) Inventors: Matthew Paul Mellor, Cockermouth (GB); Ashley Napier, Cockermouth (GB)

(73) Assignee: Create Technologies Limited, Cockermouth (GB)

( * ) Notice: Subject to any disclaimer, the term of this patent is extended or adjusted under 35 U.S.C. 154(b) by 221 days.

(21) Appl. No.: 16/222,612

(22) Filed: Dec. 17, 2018

(65) Prior Publication Data

US 2019/0154846 A1    May 23, 2019

Related U.S. Application Data

(63) Continuation of application No. PCT/GB2017/051935, filed on Jun. 30, 2017.

(30) Foreign Application Priority Data

Jun. 30, 2016 (GB) .................................... 1611429

(51) Int. Cl.
*G01T 1/169* (2006.01)
*G01S 13/08* (2006.01)
*G01S 15/08* (2006.01)
*G01S 17/08* (2006.01)

(52) U.S. Cl.
CPC .............. *G01T 1/169* (2013.01); *G01S 13/08* (2013.01); *G01S 15/08* (2013.01); *G01S 17/08* (2013.01)

(58) Field of Classification Search
CPC combination set(s) only.
See application file for complete search history.

(56) References Cited

U.S. PATENT DOCUMENTS

| 8,519,343 B1 * | 8/2013 | Mihailescu | ........... G01T 1/1647 |
| | | | 250/367 |
| 8,825,260 B1 | 9/2014 | Silver et al. | |
| 2001/0056234 A1 * | 12/2001 | Weinberg | ............. A61B 6/4258 |
| | | | 600/436 |
| 2005/0109939 A1 | 5/2005 | Engler et al. | |
| 2008/0092556 A1 * | 4/2008 | Stein | ..................... F25D 19/006 |
| | | | 62/45.1 |
| 2010/0262400 A1 | 10/2010 | Devito | |
| 2012/0043471 A1 | 2/2012 | Harpring et al. | |

(Continued)

FOREIGN PATENT DOCUMENTS

| EP | 0542561 | 5/1993 |
| JP | 09113627 | 5/1997 |
| WO | WO 2015/024694 | 2/2015 |

*Primary Examiner* — Mamadou L Diallo
(74) *Attorney, Agent, or Firm* — Levine Bagade Han LLP

(57) ABSTRACT

A portable survey meter for measuring radiation, the portable survey meter comprising: a radiation detector configured to perform measurements of radiation; a range sensor configured to measure range data of distances from the portable survey meter to real world structures in at least two dimensions; and a processing unit configured to align the measured range data with reference range data so as to determine an instantaneous position of the portable survey meter in at least two dimensions relative to the real world structures as a fixed frame of reference, whereby each measurement is performed at a known position.

25 Claims, 1 Drawing Sheet

(56) References Cited

U.S. PATENT DOCUMENTS

| | | | |
|---|---|---|---|
| 2012/0273688 A1* | 11/2012 | Tsai | G01T 1/023 |
| | | | 250/370.07 |
| 2013/0237811 A1* | 9/2013 | Mihailescu | A61B 8/4438 |
| | | | 600/424 |
| 2014/0176677 A1 | 6/2014 | Valkenburg et al. | |
| 2014/0232841 A1* | 8/2014 | Ohta | H05G 1/60 |
| | | | 348/65 |
| 2014/0240134 A1* | 8/2014 | Cibils | G01V 5/0091 |
| | | | 340/600 |
| 2015/0029489 A1* | 1/2015 | Metzler | G01S 7/4817 |
| | | | 356/4.01 |
| 2015/0085977 A1* | 3/2015 | Jarvikivi | G01N 23/223 |
| | | | 378/44 |
| 2015/0237419 A1* | 8/2015 | Lee | H04Q 9/00 |
| | | | 340/870.02 |
| 2016/0033643 A1 | 2/2016 | Zweigle et al. | |
| 2018/0292541 A1* | 10/2018 | De Silva | G01S 19/51 |
| 2019/0383609 A1* | 12/2019 | Simon | G01C 17/38 |

\* cited by examiner

ND METHOD

PORTABLE SURVEY METER AND METHOD

CROSS-REFERENCE TO RELATED APPLICATIONS

This application is a continuation of International Patent Application Number PCT/GB2017/051935 filed Jun. 30, 2017, which claims priority to GB Patent Application Number 1611429.0 filed Jun. 30, 2016, the contents of which are incorporated herein by reference in their entirety.

BACKGROUND OF THE INVENTION

The present invention relates to a portable survey meter and a method for measuring radiation. More particularly, an embodiment of this invention relates to an autonomous, portable survey meter for collecting spatially registered radiation measurements within a region such as a nuclear facility.

When operating or decommissioning a facility containing radioactive material it is frequently necessary to understand the distribution of activity such that its effects on the environment and any persons entering that environment can be determined. It is often the case that the physical properties of such a facility need to be determined also. Conventional methods for determining this information typically involve bulky equipment and rely on external references such as markers or fixed reference points, at various positions around the facility. This is often not permitted or practical in a potentially contaminated environment.

A radiological survey of a facility may be performed, with the positions and measurements recorded. At a later point in time, it may be desirable to repeat the survey to determine how the distribution of radiation has changed. Radiological measurements are sensitive to the position at which they are taken. It is important therefore that the measurements made in the repeat survey are taken from the same positions as in the previous survey.

BRIEF SUMMARY OF THE INVENTION

The present invention aims to alleviate this issue by providing a method to collect both spatial and radiological data in a manner that is independent of the facility being surveyed and can be deployed without reliance on any external input or reference.

Accordingly, one aspect of the present invention provides a portable survey meter for measuring radiation, the portable survey meter comprising:

a radiation detector configured to perform measurements of radiation;

a range sensor configured to measure range data of distances from the portable survey meter to real world structures in at least two dimensions; and a processing unit configured to align the measured range data with reference range data so as to determine an instantaneous position of the portable survey meter in at least two dimensions relative to the real world structures as a fixed frame of reference, whereby each measurement is performed at a known position.

Another aspect of the present invention provides a method for measuring radiation, the method comprising:

performing measurements of radiation using a portable survey meter;

measuring range data of distances from the portable survey meter to real world structures in at least two dimensions; and aligning the measured range data with reference range data so as to determine the instantaneous position of the portable survey meter in at least two dimensions relative to the real world structures as a fixed frame of reference, whereby each measurement is performed at a known position.

Other, optional, aspects of the invention are defined in the dependent claims.

BRIEF DESCRIPTION OF THE SEVERAL VIEWS OF THE DRAWINGS

Embodiments of the invention make it possible to record the spatial location of radiological measurements in a survey more accurately than traditional radiation surveys allow. Embodiments of the invention are expected to improve how accurately a survey can be repeated.

Embodiments of the invention will now be described, by way of example only, with reference to the accompanying drawings in which:

FIG. 1 schematically depicts a portable survey meter according to an embodiment of the invention. Optionally, the portable survey meter is for measuring radiation. Optionally, the portable survey meter is for checking for radioactive contamination. Alternatively, the portable survey meter may be used to carry out repeatable noise level surveys (i.e. measuring acoustic intensity) around a noisy industrial workplace.

DETAILED DESCRIPTION OF THE INVENTION

Figure 1:
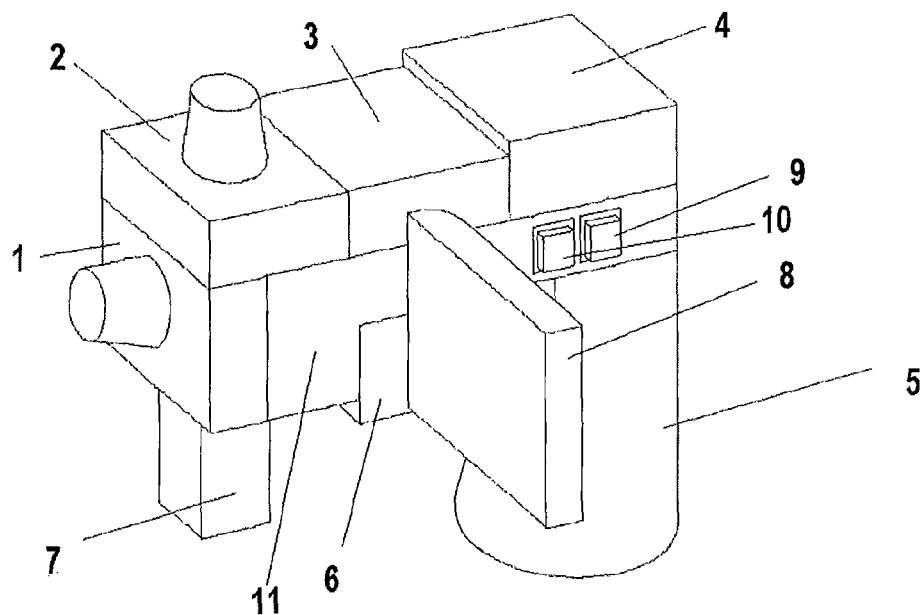
FIG. 1 schematically depicts a portable survey meter according to an embodiment of the invention.

The portable survey meter can be used in a method for collecting spatially registered radiological measurements. Optionally, the portable survey meter comprises a radiation detector 7. Alternatively, the portable survey meter may comprise a noise detector configured to perform noise measurements of acoustic intensity.

Optionally, the radiation detector 7 is configured to perform measurements (e.g. radiological measurements) of ionising radiation. The radiation detector 7 is a means of measuring the level of ionising radiation. Additionally or alternatively, the radiation detector 7 is configured to perform measurements of non-ionising radiation.

Optionally, the portable survey meter comprises a range sensor 1, 2. The range sensor 1, 2 is configured to measure range data of distances from the portable survey meter to real world structures in at least two dimensions. The range data is interpreted by an algorithm to determine an instantaneous position of the portable survey meter in at least two dimensions relative to the real world structures as a fixed frame of reference. The range sensor combines with software running the algorithm to determine the position of the portable survey meter relative to the real world structures. Accordingly, each radiological measurement is performed at a known position.

The range sensor 1, 2 combined with the software is a means of determining the instantaneous position of the portable survey meter (which may also be called a detector) in a least two dimensions relative to real world structures surrounding the portable survey meter.

Each range sensor 1, 2 is configured to measure the distance (i.e. range) from the portable survey meter to a real world object, such as a wall. The range sensor 1, 2 is configured to measure time-varying range data about how far the portable survey meter is from real world structures in different directions. In particular, the first range sensor 1 is configured to measure the range to real world objects in the XY plane. The range data is then used to determine the position of the portable survey meter to the real world objects. This can be done by aligning the range data to known information about the real world structures.

For example, the range data may provide information about the distance from the portable survey meter to a series of points of a room. The position of the portable survey meter can then be determined by aligning the range data to a map of the room. The map of the room is an example of known information about the layout of the real world structures. Hence, the measured range data is interpreted to provide positional information relative to the real world structures. This interpretation is performed by software that runs an algorithm configured to deduce the motion of the portable survey meter by aligning the range data with reference range data (e.g. a map).

By aligning the measured range data to reference range data (e.g. a map of the real world structures), the position of the portable survey meter can be determined relative to the real world structures as the fixed frame of reference. This is different from other means of detecting position such as GPS, radio beacon methods and QR code readers. GPS, radio beacon methods and QR code readers rely on measuring the distance to satellites, beacons or QR codes that have a known position in a coordinate system. The position of the reader can be determined by measuring the distance to multiple satellites, beacons or QR codes and solving equations to determine the position of the reader within that coordinate system. These methods do not involve aligning the measured distances to the satellites, beacons or QR codes to reference range data.

The invention does not require any real world objects to be installed for the purpose of position determination. In particular, the invention does not require any satellite, beacon or QR code. The real world structures are not satellites, beacons or QR codes. Instead, the range sensor 1, 2 measures the range to objects that just happened to be there. The position of the objects in another coordinate system is not required to be known. The measured range data is aligned with the reference range data so that the real world structures themselves become the fixed frame of reference.

Alignment of range data may be achieved by any algorithm which is capable of calculating a transform between the current range data and one or more examples of reference range data. It is preferable in the present application that such algorithms be designed to keep computation demands to a minimum in order that the physical space and power requirements of the radiation measurement device can be kept low. An algorithm which is particularly suitable for aligning horizontal-plane range data is described:

1) Each example of horizontal plane range data (either current or reference) is 'rotational normalised' based on intrinsic properties of the data rather than by comparing with reference data. This reduces the dimension of the alignment problem space from three dimensions (X, Y, Theta) to two dimensions (X, Y). A good measure of intrinsic orientation in man-made environments is to apply a candidate rotation, calculate a one-dimensional histogram, H, of X values and Y values of the range data and then to calculate the entropy of this histogram (approximated by the sum of H multiplied by the natural logarithm of H). The intrinsic orientation is that which minimises the entropy score. Note that it is only necessary to search over a 90 degree range of orientation as this measure of orientation is invariant to rotations of 90 degrees.

2) The two dimensional search can then be reduced to two one dimensional searches by comparing the X and Y histograms of the current and reference range data. To align the X axes of the current data with the reference scan, it is sufficient to search for the maximum of $F(Rx(X),Cx(X+Xo))$ with respect to Xo, where F is a similarity measure function whose output is maximised when the histograms are aligned, $Rx(X)$ is the histogram of X values of the reference data, $Cx(X)$ is a histogram of the current data and Xo is a candidate value for the X offset between reference data and current data. F can be any measure of similarity between histograms or probability distributions; the simplest method being the dot product of the two input histograms. Because this method is computationally inexpensive, it is generally possible to maximise $F(Rx(i),Cx(i+Xo))$ by exhaustive search. Note that, because of the symmetry of the orientation normalisation step with respect to 90 degree rotations, it is not sufficient to compare $Cx(i)$ with $Rx(i)$ and $Cy(i)$ with $Ry(i)$ because there may be an orientation shift of a multiple of 90 degree between reference and current data. This can be resolved by aligning all four possible orientations independently and taking the orientation with the highest alignment score as the true orientation. The four alignments can be implemented by comparing: $Cx(i)$ with $Rx(i)$ and $Cy(i)$ with $Ry(i)$; $Cx(i)$ with $Ry(i)$ and $Cy(i)$ with $Rx(-i)$; $Cx(i)$ with $Rx(-i)$ and $Cy(i)$ with $Ry(-i)$; and $Cx(i)$ with $Ry(-i)$ and $Cy(i)$ with $Rx(i)$.

The algorithm related above will also work for vertical lidar data if step 2 is restricted to a the vertical dimension only. As described, the algorithm is limited to the case where the current data overlaps significantly with the reference data. In applications where this is not the case, the algorithm can be extended by introducing the concept of a key-frame. When the current range data is found to be offset from the reference data by some pre-determined distance threshold, or when the similarity score drops beneath a pre-determined threshold, the current frame is nominated as a 'key-frame'. Subsequent range data will be registered to the most recent fey-frame rather than the original reference data. The alignment between the original reference data and the current data can then be deduced by combining the transform between the current data and the current key-frame with the transform between the current key-frame and the reference frame (which may itself depend on the transforms of other intermediate key-frames).

Optionally, the portable survey meter comprises a means of continuously recording spatial data such that a 3D model can be generated as the portable survey meter is moved around the area.

The measurement of radiological and geometrical data may be achieved using a combination of sensors (e.g. the radiation detector 7 and the range sensor 1, 2). The sensors that provide the geometrical data may be configured to determine the location and orientation of the portable survey meter in six degrees of freedom relative to real world structures. However, this is not necessarily the case. The sensors that provide the geometrical data may be configured to determine the location of the portable survey meter in two degrees of freedom (e.g. in a horizontal plane), three degrees of freedom (e.g. in a horizontal plane and a vertical plane), four degrees of freedom (e.g. in a horizontal plane and a vertical plane and the yaw of the portable survey meter) or five degrees of freedom (e.g. in a horizontal plane and a vertical plane and the pitch and yaw of the portable survey meter).

As depicted in FIG. 1, the portable survey meter optionally comprises two range sensors 1, 2. However, this is not necessarily the case. In alternative embodiments the portable survey meter comprises only one range sensor 1, or more than two range sensors.

Optionally, the first range sensor 1 is configured to measure range data of distances from the portable survey meter to real world structures in the horizontal (XY) plane. Optionally, the range sensor 1, 2 is configured to measure the range data using Light Detection and Ranging (LIDAR), Sound Navigation and Ranging (SONAR) or Radio Detection and Ranging (RADAR). The first range sensor 1 could be a LIDAR instrument, a SONAR instrument or a RADAR instrument. The first range sensor 1 is capable of measuring the distance from the portable survey meter to real world structures, surrounding the portable survey meter.

Figure 2:
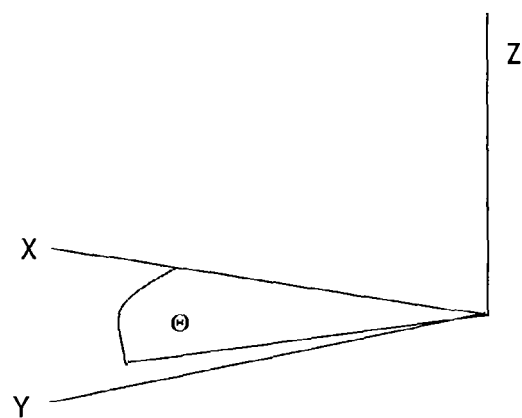
FIG. 2 schematically depicts the scanning plane of a LIDAR of a portable survey meter according to an embodiment of the invention.

When the first range sensor 1 is a LIDAR instrument, the LIDAR instrument is configured to rotate around the Z axis making an angle theta to the X axis, shown in FIG. 2. The first range sensor 1 is configured to scan the XY plane, making a series of measurements of the distance at angle theta to the nearest surface based on the time of flight of laser pulses emitted by the LIDAR instrument and reflected off the surface. Change in position of the portable survey meter over time can be measured by calculating the translation and rotation that best aligns the current range data with the previous (e.g. initial) range data. The reference range data to which measured rage data is aligned may be the initial range data measured when a survey is started. Hence, it is not necessary for a map of the region to be surveyed to be known. Even without such a map it is possible for a model of the region to be built up during the survey.

The survey meter of the present invention is designed to be portable. The portable survey meter could be hand held. As a result, there is the possibility that the portable survey meter does not remain fixed in the XY plane throughout the survey, and/or the portable survey meter may move vertically. Furthermore, the portable survey meter may be tilted, giving a false impression of the surrounding world. Optionally, to counteract this, the output from the first range sensor 1 (which may also be called a horizontal position measurement device) is corrected for tilt as described below.

Optionally, the portable survey meter comprises an orientation detector 3. The orientation detector 3 is configured to determine at least one of an instantaneous yaw, an instantaneous roll and an instantaneous pitch of the portable survey meter relative to the real world structures. The orientation detector 3 is configured to measure the tilt of the portable survey meter such that a correction factor can be applied to the XY data to ensure it represents a more accurately horizontal plane. Optionally, the orientation detector is an Inertial Measurement Unit (IMU) configured to measure at least six degrees of freedom. Optionally, the portable survey meter comprises a magnetometer for improved orientation accuracy.

Optionally, the portable survey meter comprises a mechanical stabiliser device. Optionally, the mechanical stabiliser device is fitted to the rest of the portable survey meter so as to prevent or reduce any tilt.

Optionally, the portable survey meter comprises a positional feedback provider. The positional feedback provider is configured to output to a user information to help the user move the portable survey meter to a target position and/or orientation relative to the real world structures. Optionally, the positional feedback provider is configured to output to the user information to help the user change at least one of the yaw, the roll and the pitch of the portable survey meter to a target yaw, a target roll and a target pitch, respectively, relative to the real world structures. Optionally, the positional feedback provider is configured to provide feedback to allow the user to manually correct for any tilt.

If an IMU is used as the orientation detector 3, the instantaneous pitch, roll and yaw of the portable survey meter can be measured such that, when combined with the data measured by the first range sensor 1, five of the six degrees of freedom are known (X, Y, pitch, roll and yaw).

In order to determine the position of the detector in the Z direction, or height above the ground, another sensor, i.e. the second range sensor 2, is required. Optionally, a second LIDAR, SONAR or RADAR detector could be used. Optionally, the portable survey meter comprises a processing unit 4 (also called a main processing unit). Utilising the assumption that the ground is flat and once the angle of the portable survey meter (away from vertical) is known, trigonometry can be used to calculate the height of the portable survey meter. Optionally, the processing unit 4 is configured to calculate the height of the portable survey meter based on the angle of the portable survey meter as measured by the orientation detector 3. Optionally, the second range sensor 2 is rigidly attached to the first range sensor 1. The data output by the range sensor 1, 2 can be used to build a 3D model. When all six degrees of freedom are known the position of the portable survey meter within the 3D model can be accurately plotted by the processing unit 4. Optionally, the processing unit 4 is configured to receive range data from the first range sensor 1 and, if the second range sensor 2 is provided, also from the second range sensor 2. The processing unit 4 is configured to compare the range data with previous range data (possibly the initial range data). The processing unit 4 is configured to calculate the translation and rotation that best aligns the current range data with the previous (e.g. initial) range data so as to measure a change in position and/or orientation of the portable survey meter over time. Alternatively, the processes of comparing the range data and calculating the translation and rotation to measure the change in position may be performed by a processor that is positioned remotely from the portable survey meter.

Additionally or alternatively, the portable survey meter comprises a height detector configured to determine an instantaneous height of the portable survey meter above a floor. Optionally, the height detector is a sensor that directly measures a property that changes predictably with changes of position in the Z direction. For example, optionally the portable survey meter comprises a barometric pressure sensor.

Radiological data is collected using a suitable radiation detector 7, for example a Geiger-Muller tube, a total count detector or a scintillator. The types of radiation that are measured may not be limited to gamma rays but may be any type or types of ionising or non-ionising radiation. The device collects a series of measurements of the radiation field at registered positions, determined by the range sensor 1, 2 and software described above. Optionally the radiation detector 7 is rigidly attached the range sensor 1, 2.

The output from each of the range sensor 1, 2, the software and the radiation detector 7 provides a two or three dimensional model of the facility, a series of radiation measurements and a set of coordinates (optionally corrected for the orientation of the portable survey meter) that describe the location of each radiation measurement within the model. Optionally, the portable survey meter comprises a local memory. The local memory is configured to record the position of the portable survey meter at which each radiological measurement was performed in association with the radiological measurement. This information is stored on-board the portable survey meter on a suitable storage device such that it can be retrieved at a later time for further processing or manipulation.

Optionally, the portable survey meter comprises a data uploader. The data uploader is configured to send information indicating each radiological measurement and the position of the portable survey meter at which the radiological measurement was performed to an external memory.

The optional final stage in the process is to utilise the information gathered by the portable survey meter described above to predict the distribution of radioactive sources within the facility. To do this the method outlined in European patent 2074442 could be used.

The portable survey meter illustrated in FIG. 1 is an apparatus that comprises two LIDAR sensors mounted such that one scans the XZ vertical plane while the other scans the XY horizontal plane, as the range sensors 1, 2. It is not essential to have two range sensors 1, 2. In an alternative embodiment the portable survey meter comprises only one range sensor 1, such that the position of the portable survey meter can be determined in two dimension (i.e. in the XY plane). Optionally, the portable survey meter comprises a height detector configured to measure the height of the portable survey meter. In these embodiments, LIDAR data is used to improve the accuracy and stability of roll correction as follows: during each scan a histogram is made of the vectors between successive LIDAR echoes. Peaks appear in the histogram separated by 90 degrees, representing the floor/ceiling and the walls as real world structures. Assuming that the structure of the surrounding region does not fundamentally change between scans, the histogram obtained from successive scans will be similar but offset by any change in the roll angle of the unit. This therefore provides a means of detecting and correcting for changes in roll angle which is used to refine the data obtained from the IMU as the orientation detector 3.

In other embodiments SONAR, RADAR or other forms of scanning or staring distance measurement sensors may be used. A Geiger-Muller tube is used as the radiation detector 7 (also called a radiometric sensor) in this embodiment. However in other embodiments the radiation detector 7 may be, for example, an uncollimated total-counts gamma radiation sensor, an un-collimated total absorbed dose radiation sensor or any other type of radiation detector as required by the application. Optionally, the radiation detector 7 is configured to perform a radiological measurement by detecting an amount of radiation received from any direction over a predetermined time period. The radiation detected by the radiation detector 7 is not limited to gamma radiation but may be any type or types of ionising or non-ionising radiation.

Optionally, the radiation detector 7, the range sensors 1, 2 and the orientation detector 3 are mounted together. Optionally, the portable survey meter comprises a frame 11. The radiation detector 7, the range sensors 1, 2 and the orientation detector 3 may be mounted on the frame 11, so that they are fixed relative to each other. The frame 11 can be hand-held. The frame 11 may be mounted on a remote deployment platform, for example a long pole or a remotely operated vehicle, such as a remotely controllable platform with robotic arm, or a quadcopter. This may be particularly advantageous if deployment is required in a region where expected radiation levels are too high to permit human entry.

As mentioned above, optionally the portable survey meter comprises a positional feedback provider. Optionally, the portable survey meter comprises a display 8, which may form part of the positional feedback provider. The display 8 may be mounted to the frame 11 so that the display 8 can display instructions directing the user to the next target position (i.e. measurement point).

Optionally, the positional feedback provider is configured to output to the user information to help the user change the height of the portable survey meter to a target height relative to the floor.

Optionally, the radiation detector 7 is configured to automatically perform a radiological measurement when the difference between the instantaneous position of the portable survey meter and a target position is less than a threshold positional difference. In other words, the measurement is triggered automatically once the portable survey meter is sufficiently close to the intended location (i.e. the target position). However, it is not necessary for the measurement to be performed automatically.

Optionally, the portable survey meter comprises an input device configured to allow a user to instruct the radiation detector 7 to perform a radiological measurement at the current position of the portable survey meter. In the embodiment depicted in FIG. 1, the input device is a trigger 10. The trigger 10 is provided so that once at the correct location the user can provide an input causing the portable survey meter to take a spatially tagged radiation measurement. Alternatively, the measurement could be triggered by other means of user input.

Optionally, the radiation detector 7 is configured to perform a radiological measurement simultaneously with the range sensor 1, 2 combined with the software determining the instantaneous position of the portable survey meter. Accordingly, each radiation measurement is spatially tagged. Each radiation measurement is stored together with information regarding the position and optionally orientation of the portable survey meter.

Optionally, the portable survey meter comprises a handle 5. The handle makes it easier for a user to hold the portable survey meter steadily while moving around a facility to take a survey.

Optionally, the portable survey meter comprises a battery 6. The battery 6 is provided as a power source for the portable survey meter. Optionally, the portable survey meter comprises a switch 9. The switch 9 is a power switch for the portable survey meter.

The portable survey meter is taken to the facility to be modelled and is switched on using switch 9. On completion of the power-up sequence, surveying may be started automatically. The portable survey meter starts to record positional data as follows: the range sensors 1, 2 record distances to real-world structures within their respective measurement planes and the orientation detector 3 records relative position and orientation continuously. This data is stored on a storage medium within the processing unit 4 and is also processed in real time using an algorithm to build up a 2D model of the surveyed region. Optionally, the processing unit 4 comprises the software that is configured to align the measured range data with reference range data so as to determine the instantaneous position of the portable survey meter in at least two dimensions relative to the real world structures as a fixed frame of reference.

The Manhattan world assumption, that structures appear little different from observation points closely spaced along the Z axis, is used in processing. This model is held in the processing unit 4. The processing unit 4 is also loaded up with a series of target positions (i.e. a set of survey locations) relative to the facility structure.

Optionally, the portable survey meter comprises a target position setting unit, which may be embodied in the processing unit 4. Once the 2D model has built up sufficiently for the processing unit 4 to locate itself within the facility structure, the direction and distance to the next survey location is indicated on the display 8. Optionally, the target position setting unit is configured to set a new target position from among the series of target positions after the radiation detector 7 has performed the radiological measurement at the target position. Optionally, the target position setting unit is configured to set a new target position from among the series of target positions upon instruction from a user to skip the target position.

In other embodiments the order of measurements might be unimportant and the portable survey meter might direct the user to the closest measurement point rather than the next in sequence. Once the portable survey meter is at the desired survey point, a measurement is made automatically or on demand based on the user pressing the trigger 10. Embodiments may feature a software interlock to prevent the measurement being taken when the unit is too far from the survey point, or they may eliminate the user input in favour of having the measurement triggered automatically when the sensor is within an acceptable distance of the required survey location.

Optionally, the radiation detector 7 is configured to automatically perform a radiological measurement when the difference between the instantaneous position of the portable survey meter and a target position is less than a threshold positional difference and the difference between the at least one of the instantaneous yaw, the instantaneous roll and the instantaneous pitch of the portable survey meter and a target yaw, a target roll and a target pitch, respectively, is less than a threshold yaw difference, a threshold roll difference and a threshold pitch difference, respectively.

Optionally, the radiation detector 7 is configured to automatically perform a radiological measurement when the difference between the instantaneous position of the portable survey meter and a target position is less than a threshold positional difference and the difference between the instantaneous height of the portable survey meter and a target height is less than a threshold height difference.

Embodiments may provide visual, audio or other sensory feedback to the operator to indicate the progress and completion of the measurement. When each radiation measurement is completed it is tagged with a location, relative to the 2D region model, calculated from the LIDAR sensors and IMU, and stored in the storage attached to the processing unit 4.

The facility could be a single room, multiple rooms in a building, the exterior surface of building walls or indeed any three dimensional environment containing unknown distribution of radioactive material in which it is possible to determine location and orientation using the inbuilt geometric sensors, i.e. the range sensors 1, 2 and the orientation detector 3. The general term "region" is used for any such facility or space for which it is intended to determine the distribution of radioactive material.

The number of observations required will be determined by the operator's survey requirements but the automated spatial registration and user feedback provided by the unit facilitate the recording of a larger number of survey points in the same time when compared to existing manual techniques.

After data collection is complete the data is transferred from the apparatus to a separate computer system for analysis. The data as collected provides dose information at a number of locations within the surveyed region. This data is similar in nature to that obtained by a manually conducted radiation survey in which the location of each measurement is simply marked approximately on a floor plan of the facility, but by using this embodiment of the invention the spatial location of each measurement is recorded much more accurately than traditional radiation surveys allow.

List of reference numerals used in FIG. 1:
1. first range sensor
2. second range sensor
3. orientation detector
4. processing unit
5. handle
6. battery
7. radiation detector
8. display
9. switch
10. trigger
11. frame

We claim:

1. A portable survey meter for measuring radiation, the portable survey meter comprising:
   a radiation detector configured to perform measurements of radiation;
   a range sensor configured to measure range data of distances from the portable survey meter to real world structures in at least two dimensions; and
   a processing unit configured to align the measured range data with reference range data so as to determine an instantaneous position of the portable survey meter in at least two dimensions relative to the real world structures as a fixed frame of reference, whereby each measurement is performed at a known position.

2. The portable survey meter of claim 1, wherein the radiation detector is configured to perform a measurement simultaneously with the software determining the instantaneous position of the portable survey meter.

3. The portable survey meter of claim 1, further comprising:
   a positional feedback provider configured to output to a user information to help the user move the portable survey meter to a target position relative to the real world structures.

4. The portable survey meter of claim 1, wherein the radiation detector is configured to automatically perform a measurement when a difference between the instantaneous position of the portable survey meter and a target position is less than a threshold positional difference.

5. The portable survey meter of claim 4, comprising:
   a target position setting unit configured to set a new target position from among a series of target positions after the radiation detector has performed the measurement at the target position.

6. The portable survey meter of claim 5, wherein the target position setting unit is configured to set a new target position from among the series of target positions upon instruction from a user to skip the target position.

7. The portable survey meter of claim 1, wherein the range sensor is configured to measure the range data using LIDAR, SONAR or RADAR.

8. The portable survey meter of claim 1, comprising:
an input device configured to allow a user to instruct the radiation detector to perform a measurement at the current position of the portable survey meter.

9. The portable survey meter of claim 3, further comprising:
an orientation detector configured to determine at least one of an instantaneous yaw, an instantaneous roll and an instantaneous pitch of the portable survey meter relative to the real world structures.

10. The portable survey meter of claim 9, wherein the positional feedback provider is configured to output to the user information to help the user change at least one of the yaw, the roll and the pitch of the portable survey meter to a target yaw, a target roll and a target pitch, respectively, relative to the real world structures.

11. The portable survey meter of claim 9, wherein the radiation detector is configured to automatically perform a measurement when the difference between the instantaneous position of the portable survey meter and a target position is less than a threshold positional difference and the difference between the at least one of the instantaneous yaw, the instantaneous roll and the instantaneous pitch of the portable survey meter and a target yaw, a target roll and a target pitch, respectively, is less than a threshold yaw difference, a threshold roll difference and a threshold pitch difference, respectively.

12. The portable survey meter of claim 9, further comprising:
a height detector configured to determine an instantaneous height of the portable survey meter above a floor.

13. The portable survey meter of claim 12, wherein the positional feedback provider is configured to output to the user information to help the user change an instantaneous height of the portable survey meter to a target height relative to the floor.

14. The portable survey meter of claim 12, wherein the radiation detector is configured to automatically perform a measurement when the difference between the instantaneous position of the portable survey meter and a target position is less than a threshold positional difference and the difference between the instantaneous height of the portable survey meter and a target height is less than a threshold height difference.

15. The portable survey meter of claim 1, wherein the radiation detector is configured to perform a measurement by detecting an amount of radiation received from any direction over a predetermined time period.

16. The portable survey meter of claim 1, comprising:
a local memory configured to record the position of the portable survey meter at which each radiation measurement was performed in association with the radiation measurement.

17. The portable survey meter of claim 1, wherein the processing unit is configured to align the measured range data with the reference range data in real time so as to build up a model of a surveyed region, wherein the model is in at least two dimensions.

18. The portable survey meter of claim 1, comprising:
a display configured to display the model to the user.

19. The portable survey meter of claim 1, comprising:
a display configured to output to a user information to indicate the instantaneous position of the portable survey meter within the fixed frame of reference.

20. The portable survey meter of claim 1, wherein the processing unit is configured to calculate a translation and rotation that best aligns the measured range data with previously measured range data so as to measure a change in position and/or orientation of the portable survey meter over time.

21. The portable survey meter of claim 1, wherein the portable survey meter is hand-held.

22. The portable survey meter of claim 1, wherein the radiation detector is configured to perform measurements of ionising radiation.

23. The portable survey meter of claim 1, wherein the radiation detector is configured to perform measurements of ambient radiation.

24. The portable survey meter of claim 1, comprising:
a data uploader configured to send information indicating each measurement and the position of the portable survey meter at which the measurement was performed to an external memory.

25. A method for measuring radiation, the method comprising:
performing measurements of radiation using a portable survey meter;
measuring range data of distances from the portable survey meter to real world structures in at least two dimensions; and
aligning the measured range data with reference range data so as to determine the instantaneous position of the portable survey meter in at least two dimensions relative to the real world structures as a fixed frame of reference, whereby each measurement is performed at a known position.

* * * * *